(12) United States Patent
Watanabe et al.

(10) Patent No.: US 10,544,796 B2
(45) Date of Patent: *Jan. 28, 2020

(54) IMPELLER AND ROTARY MACHINE

(71) Applicant: MITSUBISHI HEAVY INDUSTRIES, LTD., Tokyo (JP)

(72) Inventors: Yasunori Watanabe, Tokyo (JP); Ryoji Okabe, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 328 days.

This patent is subject to a terminal disclaimer.

(21) Appl. No.: 15/529,773

(22) PCT Filed: Oct. 9, 2015

(86) PCT No.: PCT/JP2015/078763
§ 371 (c)(1),
(2) Date: May 25, 2017

(87) PCT Pub. No.: WO2016/088450
PCT Pub. Date: Jun. 9, 2016

(65) Prior Publication Data
US 2017/0306973 A1    Oct. 26, 2017

(30) Foreign Application Priority Data

Dec. 3, 2014 (JP) ................. 2014-245156

(51) Int. Cl.
*B63H 1/26* (2006.01)
*F04D 29/26* (2006.01)
(Continued)

(52) U.S. Cl.
CPC ............. *F04D 29/266* (2013.01); *F01D 5/04* (2013.01); *F01D 5/048* (2013.01); *F02C 6/12* (2013.01);
(Continued)

(58) Field of Classification Search
CPC ......... F01D 5/147; F01D 5/282; F04D 29/324
(Continued)

(56) References Cited

U.S. PATENT DOCUMENTS 4,715,780 A * 12/1987 Kan ................... B29C 45/1459
384/492
4,827,589 A    5/1989 Friedrichs
(Continued)

FOREIGN PATENT DOCUMENTS

CN    101016872 A    8/2007
CN    102472296 A    5/2012
(Continued)

OTHER PUBLICATIONS

Written Opinion of the International Searching Authority and International Search Report (Forms PCT/ISA/237 and PCT/ISA/210), dated Jan. 12, 2016, for International Application No. PCT/JP2015/078763, with an English translation.
(Continued)

*Primary Examiner* — John Kwon
(74) *Attorney, Agent, or Firm* — Birch, Stewart, Kolasch & Birch, LLP

(57) ABSTRACT

This impeller is equipped with: an impeller body formed from a resin and shaped as a disk with an axis as the center thereof, and having a boss hole section formed therein which a rotating shaft for rotating around the axis engages; compressor blades provided on the front-surface side of the impeller body; and a ring-shaped reinforcing ring provided inside the impeller body in the circumferential direction of the impeller body.

20 Claims, 4 Drawing Sheets

(51) Int. Cl.
  F04D 29/28 (2006.01)
  F01D 5/04 (2006.01)
  F02C 6/12 (2006.01)
  F04D 17/10 (2006.01)

(52) U.S. Cl.
  CPC .......... F04D 17/10 (2013.01); F04D 29/284 (2013.01); *F02M 2700/331* (2013.01)

(58) Field of Classification Search
  USPC .............................................. 416/223 R, 224
  See application file for complete search history.

(56) References Cited

U.S. PATENT DOCUMENTS

| | | | |
|---|---|---|---|
| 5,464,325 A | 11/1995 | Albring et al. | |
| 5,800,128 A | 9/1998 | Bodmer et al. | |
| 2002/0187045 A1* | 12/2002 | Ijima | F04D 29/2227 416/223 A |
| 2003/0156772 A1* | 8/2003 | Yamashita | F04D 29/049 384/486 |
| 2003/0180142 A1* | 9/2003 | Onoda | F04D 29/167 415/172.1 |
| 2007/0183886 A1 | 8/2007 | Koyama et al. | |
| 2011/0006485 A1* | 1/2011 | Nakagawa | F16J 15/164 277/549 |
| 2012/0148391 A1 | 6/2012 | Ibaraki et al. | |
| 2017/0306973 A1 | 10/2017 | Watanabe et al. | |
| 2017/0328372 A1* | 11/2017 | Watanabe | F04D 17/10 |

FOREIGN PATENT DOCUMENTS

| | | |
|---|---|---|
| DE | 102007045480 A1 | 4/2009 |
| JP | 62-101007 U | 6/1987 |
| JP | 62-114103 U | 7/1987 |
| JP | 63-63597 U | 4/1988 |
| JP | 63-147995 A | 6/1988 |
| JP | 3-10040 U | 1/1991 |
| JP | 3-210024 A | 9/1991 |
| JP | 7-49099 A | 2/1995 |
| JP | 2009-167882 A | 7/2009 |
| JP | 2014-237301 A | 12/2014 |

OTHER PUBLICATIONS

Written Opinion of the International Searching Authority and International Search Report, dated Jan. 12, 2016, for International Application No. PCT/JP2015/078778, with English translations.

* cited by examiner

IMPELLER AND ROTARY MACHINE

TECHNICAL FIELD

The invention relates to an impeller provided in a rotary machine, and a rotary machine including an impeller.

Priority is claimed on Japanese Patent Application No. 2014-245156, filed Dec. 3, 2014, the content of which is incorporated herein by reference.

BACKGROUND ART

While the global efforts of earth environment preservation proceed, intensification of regulations regarding exhaust gas or fuel efficiency in internal combustion engines, such as engines of automobiles is under way. Turbochargers are rotary machines that can enhance effects of fuel efficiency improvement and $CO_2$ reduction by sending compressed air into an engine to combust fuel compared to natural intake engines.

In the turbochargers, a turbine is rotationally driven with exhaust gas of an engine, thereby rotating an impeller of a centrifugal compressor. The air compressed by the rotation of the impeller is raised in pressure by being reduced in speed by a diffuser, and is supplied to the engine through a scroll flow passage. In addition, as methods for driving the turbochargers, not only methods of being driven with exhaust gas but also, for example, methods using electric motors, methods using prime movers, and the like are known.

Meanwhile, as an impeller of a turbocharger, an impeller using a complex material (hereinafter referred to as a resin) of synthetic resins, such as carbon fiber reinforced plastic, is known as described in, for example, PTL 1. Here, such a resin impeller has low rigidity compared to a metallic impeller, and if the resin impeller rotates, the amount of deformation thereof becomes large under the influence of a centrifugal force. For this reason, a boss hole into which a rotating shaft is fitted may be increased in diameter, and rotation balance may be impaired.

In view of such a problem, in the impeller described in PTL 1, the deformation of the impeller by the centrifugal force is suppressed by providing a back surface part with a metallic ring.

CITATION LIST

Patent Literature

[PTL 1] Japanese Unexamined Utility Model Registration Application Publication No. 3-10040

SUMMARY OF INVENTION

Technical Problem

As disclosed in PTL 1, since the impeller is formed of the resin in a case where a structure in which the metallic ring is fitted to an impeller body is used, the material of the impeller differ from the material of the ring. Therefore, the ring made of the metal has a larger coefficient of linear expansion than the impeller made of the resin. As a result, there is a possibility that, depending on operation conditions, the amount of expansion of the ring may become larger than that of the impeller. Therefore, there are possibilities that a stress generated in the impeller cannot be distributed to the ring, and deformation of the impeller cannot be suppressed.

Additionally, in a case where the structure in which the metallic ring is fitted to the impeller body is used, the density of the metal is high compared to the resin. Therefore, there are possibilities that the diameter of the ring itself may be increased due to the influence of a centrifugal force, and deformation of the impeller cannot be suppressed.

The invention provides an impeller and a rotary machine that can guarantee reliability even if resin materials are used.

Solution to Problem

According to a first aspect of the invention, an impeller includes an impeller body that is formed of a resin, forms a disk-like shape about an axis, and has a boss hole section formed therein, a rotating shaft rotating about the axis being fitted to the boss hole section; a plurality of blades provided on a front surface side of the impeller body; and a reinforcing ring that is disposed in a circumferential direction of the impeller body inside the impeller body, and forms an annular shape.

According to such an impeller, by disposing the reinforcing ring inside the impeller body made of the resin, the rigidity of the impeller body can be improved. Additionally, since the reinforcing ring is disposed inside the impeller body, slip-out from the impeller body can be suppressed even if a material having a different coefficient of linear expansion from the impeller body is used. Therefore, a centrifugal force that acts on the impeller body can be distributed to the reinforcing ring, the stress of the impeller body caused by the centrifugal force can be reduced, and it is possible to suppress deformation of the entire impeller.

According to a second aspect of the invention, the reinforcing ring in the above first aspect may have a base part that is exposed to an inner peripheral surface of the boss hole section in the impeller body and forms an annular shape in the circumferential direction of the rotating shaft, and an engaging part that extends in a direction of the axis from the base part, on a side closer to the inside of the impeller body than the base part.

In this way, since the reinforcing ring has the base part, and the engaging part continuous with the base part, when a tensile force acts on the impeller body to the radial outer side due to a centrifugal force acting when the impeller body rotates, the engaging part is caught inside the impeller body, so that the centrifugal force that acts on the impeller body can be firmly distributed to the reinforcing ring. Therefore, it is possible to further reduce a stress generated in the impeller body. Accordingly, deformation of the impeller body can be suppressed.

According to a third aspect of the invention, the engaging part in the reinforcing ring in the second aspect may have a curved engaging surface that is curved so as to protrude toward the impeller body side.

Since the engaging part has the curved engaging surface in this way, when a tensile force to the radial outer side caused by a centrifugal force has acted on the impeller body, the concentration of a stress generated in the impeller body can be suppressed at a position where the engaging part is caught in and brought into contact with the impeller body. Accordingly, suppression of deformation of the impeller body is possible.

According to a fourth aspect of the invention, the reinforcing ring in any of the above first to third aspects may be disposed at a position in the direction of the axis where a stress generated in the impeller body reaches a maximum.

Since the reinforcing ring is provided at such a position, a centrifugal force that acts on the impeller body can be effectively distributed to the reinforcing ring, and a stress caused by the centrifugal force acting on the impeller body can be reduced.

According to a fifth aspect of the invention, an outer peripheral end of the reinforcing ring in any one of the above first to fourth aspects may be disposed at a position that is spaced apart to be larger than 0.1 times a diameter dimension between the axis and the outer peripheral end of the impeller body, from the axis of the impeller body.

Since the reinforcing ring is disposed at such a position, a centrifugal force that acts on the impeller body can be effectively distributed to the reinforcing ring, and a stress generated in the impeller body due to the centrifugal force can be reduced.

According to a sixth aspect of the invention, the reinforcing ring in any one of the above first to fifth aspects may be formed of a complex material including a thermosetting resin and reinforcing fibers.

The coefficient of linear expansion of the complex material is small compared to metals. For this reason, by using the above-described complex material for the reinforcing ring, slackening of the reinforcing ring with respect to the impeller body due to thermal expansion does not easily occur. Additionally, since the complex material has low density compared to metal, the amount of deformation by a centrifugal force becomes small. Therefore, slackening of the reinforcing ring with respect to the impeller body can be suppressed, a centrifugal force that acts on the impeller body can be effectively distributed to the reinforcing ring, and a stress generated in the impeller body due to the centrifugal force can be reduced.

According to a seventh aspect of the invention, the reinforcing ring in the sixth aspect may be disposed such that the reinforcing fibers extend in the circumferential direction of the impeller body.

If a centrifugal force acts on the reinforcing ring, a tensile force acts in the circumferential direction. For this reason, since the reinforcing fibers extend in the circumferential direction that is a direction in which this tensile force acts, deformation of the reinforcing ring by such a tensile force itself can be suppressed. Therefore, the constraint force of the impeller body can be inhibited from decreasing, and a centrifugal force that acts on the impeller body can be distributed to the reinforcing ring. Therefore, the stress of the impeller body can be reduced, and deformation of the entire compressor impeller can be suppressed.

According to an eighth aspect of the invention, the reinforcing ring in any one of the above first to fifth aspects may be formed of a metal material.

By using such a metallic material, the rigidity of the reinforcing ring becomes high. For this reason, deformation does not easily occur when a centrifugal force has acted, and slackening of the reinforcing ring with respect to the impeller body does not easily occur. Therefore, a centrifugal force that acts on the impeller body can be effectively distributed to the reinforcing ring, and a stress generated in the impeller body due to the centrifugal force can be reduced.

According to a ninth aspect of the invention, the impeller in any one of the above first to eighth aspects may further include a second reinforcing ring that is formed on a back surface of the impeller body, is fitted to a step section, having a surface facing an outer peripheral side, from the outer peripheral side, is formed of a resin and reinforcing fibers, and forms an annular shape.

In this way, since the second reinforcing ring formed of the resin and the reinforcing fibers is provided, the material of the impeller body and the material of the second reinforcing ring become substantially the same. For this reason, a difference between the coefficients of linear expansion of the impeller body and the second reinforcing ring becomes small. As a result, the constraint force of the impeller body can be inhibited from decreasing due to an increase in the diameter of the second reinforcing ring caused by thermal expansion. Moreover, since the density of the resin is low, the constraint force of the impeller body can be inhibited from decreasing by the diameter of the second reinforcing ring being increased due to a centrifugal force. Additionally, since the second reinforcing ring includes reinforcing fibers, the rigidity of the impeller body can be improved, the constraint force of the impeller body can be inhibited from decreasing due to a diameter increase caused by the centrifugal force of the second reinforcing ring itself. Therefore, a centrifugal force that acts on the impeller body can be distributed to the second reinforcing ring, the stress of the impeller body caused by the centrifugal force can be reduced, and it is possible to further suppress deformation of the entire impeller.

According to a tenth aspect of the invention, a rotary machine includes the impeller according to any one of the above ninth to seventh aspects; and a rotating shaft that is attached to the impeller and rotates together with the impeller.

According to such a rotary machine, by disposing the reinforcing ring inside the impeller body made of the resin, the rigidity of the impeller body can be improved. Additionally, since the reinforcing ring is disposed inside the impeller body, slip-out from the impeller body can be suppressed even if a material having a different coefficient of linear expansion from the impeller body is used. Therefore, a centrifugal force that acts on the impeller body can be distributed to the reinforcing ring, and it is possible to suppress deformation of the entire impeller.

Advantageous Effects of Invention

According to the above-described impeller and rotary machine, the reinforcing ring is disposed inside the impeller body. Thus, even if resin materials are used, it is possible to guarantee reliability.

DESCRIPTION OF EMBODIMENTS

First Embodiment

Hereinafter, a turbocharger 1 (rotary machine) related to an embodiment of the invention will be described.

Figure 1:
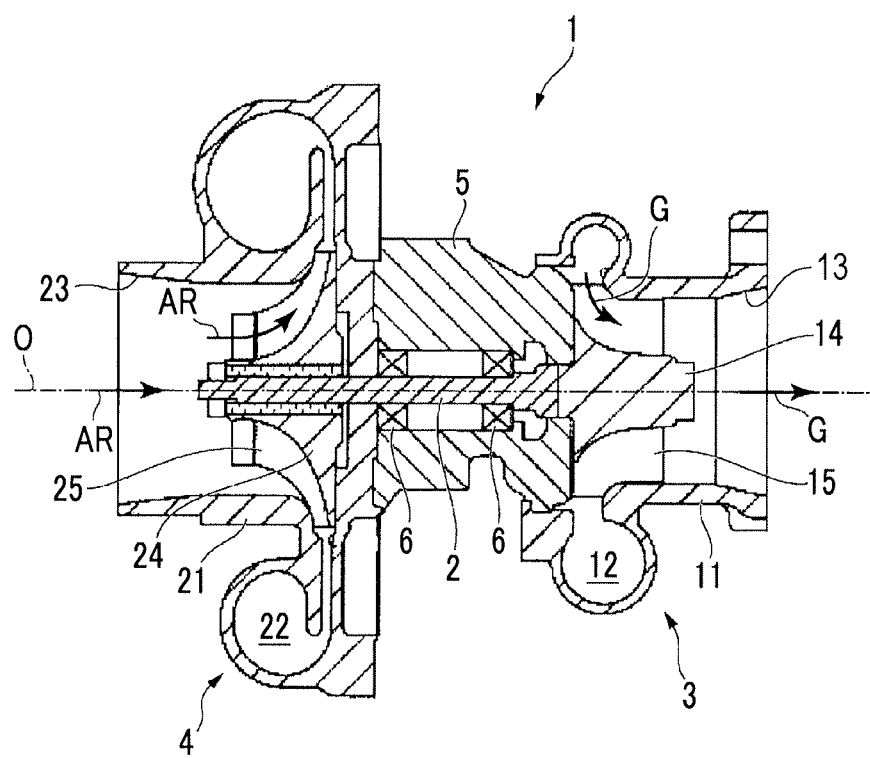
FIG. 1 is a longitudinal sectional view illustrating a turbocharger related to a first embodiment of the invention.

As illustrated in FIG. 1, the turbocharger 1 includes a rotating shaft 2, a turbine 3 and a compressor 4 that rotate together with the rotating shaft 2, and a housing coupling part 5 that couples the turbine 3 and the compressor 4 and supports the rotating shaft 2.

In this turbocharger 1, the turbine 3 is rotated by an exhaust gas G from an engine (not illustrated). Air AR compressed by the compressor 4 is supplied to the engine with the rotation of the turbine 3.

The rotating shaft 2 extends in a direction of an axis O. The rotating shaft 2 rotates about the axis O.

The turbine 3 is disposed on one side (the right side of FIG. 1) in the direction of the axis O.

The turbine 3 includes a turbine impeller 14 that has the rotating shaft 2 attached thereto and has a turbine blade 15, and a turbine housing 11 that covers the turbine impeller 14 from an outer peripheral side.

The rotating shaft 2 is fitted into the turbine impeller 14. The turbine impeller 14 is rotatable around the axis O together with the rotating shaft 2.

The turbine housing 11 covers the turbine impeller 14. A scroll passage 12, which extends from a leading edge part (an end part on a radial outer side) of the turbine blade 15 toward the radial outer side, is formed in an annular shape about the axis O at a position on the radial outer side, and allows the inside and outside of the turbine housing 11 to communicate with each other therethrough, is formed in the turbine housing 11. The turbine impeller 14 and the rotating shaft 2 are rotated by the exhaust gas G being introduced into the turbine impeller 14 from the scroll passage 12.

Additionally, a discharge port 13 opening to one side of the axis O is formed in the turbine housing 11. The exhaust gas G that has passed through the turbine blade 15 flows toward one side of the axis O, and is discharged from the discharge port 13 to the outside of the turbine housing 11.

The compressor 4 is disposed on the other side (the left side of FIG. 1) in the direction of the axis O.

The compressor 4 includes a compressor impeller 24 that has the rotating shaft 2 attached thereto and has a compressor blade 25, and a compressor housing 21 that covers the compressor impeller 24 from the outer peripheral side.

The rotating shaft 2 is fitted into the compressor impeller 24. The compressor impeller 24 is rotatable around the axis O together with the rotating shaft 2.

The compressor housing 21 covers the compressor impeller 24. A suction port 23 opening to the other side of the axis O is formed in the compressor housing 21. The air AR is introduced from the outside of the compressor housing 21 through the suction port 23 into the compressor impeller 24. Then, by a rotative force from the turbine impeller 14 being transmitted to the compressor impeller 24 via the rotating shaft 2, the compressor impeller 24 rotates around the axis O and the air AR is compressed.

A compressor passage 22, which extends from a trailing edge part (a downstream end part of a flow of the air AR) of the compressor blade 25 toward the radial outer side, forms an annular shape about the axis O at a position on the radial outer side, and allows the inside and outside of the compressor housing 21 to communicate with each other therethrough, is formed in the compressor housing 21. The air AR compressed by the compressor impeller 24 is introduced to the compressor passage 22, and is discharged to the outside of the compressor housing 21.

The housing coupling part 5 is disposed between the compressor housing 21 and the turbine housing 11. The housing coupling part 5 couples the compressor housing 21 and the turbine housing 11. The housing coupling part 5 covers the rotating shaft 2 from the outer peripheral side. The housing coupling part 5 is provided with a bearing 6, and the rotating shaft 2 is supported by the bearing 6 so as to be rotatable relative to the housing coupling part 5.

Figure 2:
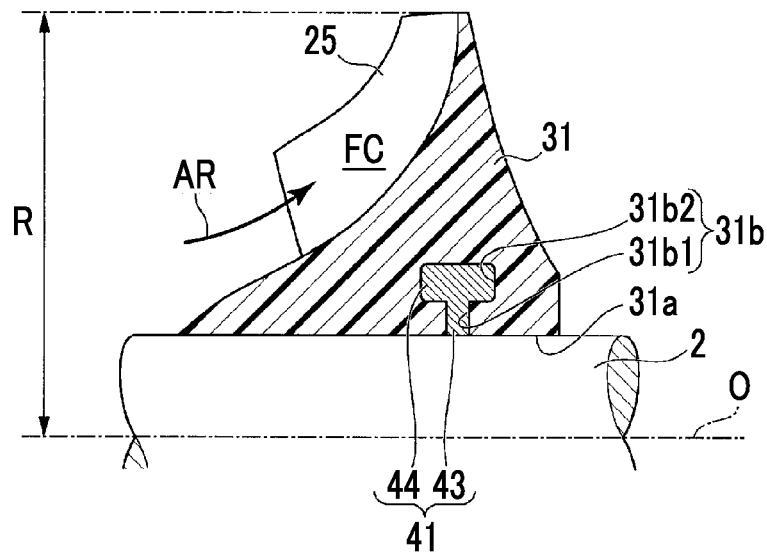
FIG. 2 is a longitudinal sectional view illustrating an impeller of the turbocharger related to the first embodiment of the invention.

Next, the compressor impeller 24 will be described in detail with reference to FIG. 2.

The compressor impeller 24 includes a plurality of the compressor blades 25, an impeller body 31 that supports the compressor blades 25 on a front surface side, and a reinforcing ring 41 disposed inside the impeller body 31.

The plurality of compressor blades 25 are provided apart from each other in a radial direction. A flow passage FC through which the air AR flows is formed between the compressor blades 25 that are adjacent to each other. The compressor blades 25 are formed of a resin in the present embodiment.

Here, as resins used for the compressor blades 25, for example, polyether sulfone (PES), polyether imide (PEI), polyether ether ketone (PEEK), polyether ketone (PEK), polyether ketone ketone (PEKK), poly ketone sulfide (PKS), polyaryl ether ketone (PAEK), aromatic polyamide (PA), polyamide imide (PAI), polyimide (PI), and the like are exemplified.

In addition, the compressor blades 25 are not limited to the case where the compressor blades are a resin.

The impeller body 31 is a so-called hub that forms a disk-like shape and supports the compressor blades 25 on the front surface side, that is, the compressor blades 25 on the other side in the direction of the axis O. The impeller body 31 is made of the same resin as that of the above-described compressor blades 25. Additionally, a boss hole section 31a having the rotating shaft 2 inserted therethrough and fitted thereinto is formed in a region on a radial inner side in the impeller body 31.

An annular groove part 31b of the rotating shaft 2 that is recessed to the radial outer side and runs in the circumferential direction is formed in an inner peripheral surface of the boss hole section 31a.

As the annular groove part 31b, an inside groove part 31b1 that opens to the inner peripheral surface of the boss hole section 31a, extends to the radial outer side, and forms a rectangular shape as the shape of a cross-section including the axis O, and an outside groove part 31b2 that communicates with the inside groove part 31b1, extends to the radial outer side, and forms a rectangular shape, which protrudes to both sides of the axis O from the inside groove part 31b1, as the shape of a cross-section including the axis O are formed.

That is, the annular groove part 31b has a T-shaped cross-section.

The reinforcing ring 41 is disposed inside the annular groove part 31b of the impeller body 31. Namely, the reinforcing ring 41 has a base part 43 that has a rectangular cross-section corresponding to the inside groove part 31b1 and forms an annular shape in the circumferential direction of the impeller body 31, and an engaging part 44 that extends to both sides in the direction of the axis O from the base part 43, on the radial outer side closer to the inside of the impeller body 53 than the base part 43 continuously with the base part 43.

The reinforcing ring 41 is disposed without a gap inside the annular groove part 31b. In the reinforcing ring 41, the base part 43 is exposed to the inner peripheral surface of the boss hole section 31a and is flush with the inner peripheral surface. In this way, the reinforcing ring 41 forms an annular shape about the axis O and has a T-shaped cross-section, in a state where the reinforcing ring is disposed inside the impeller body 31.

The reinforcing ring 41 is formed of a complex material including a thermosetting resin and reinforcing fibers. Here, as the reinforcing fibers, carbon fibers, glass fibers, Whisker, and the like can be used. Additionally, as the thermosetting resin, phenol resins, epoxy resins, melamine resins, silicon resins, and the like can be used.

The reinforcing ring 41 may be formed of metallic materials, such as aluminum, instead of the complex material.

The reinforcing ring 41 is provided to be fitted into the impeller body 31, for example by insert molding.

According to the turbocharger 1 of the present embodiment described above, the rigidity of the impeller body 31 can be improved by disposing the reinforcing ring 41 inside the impeller body 31 made of the resin in the compressor impeller 24. Additionally, since the reinforcing ring 41 is disposed inside the impeller body 31, slip-out from the impeller body 31 can be suppressed even if a material having a different coefficient of linear expansion from the impeller body 31 is used. Therefore, a centrifugal force that acts on the impeller body 31 can be distributed to the reinforcing ring 41, and a stress generated in the impeller body 31 due to the centrifugal force can be reduced. Accordingly, it is possible to suppress deformation of the entire compressor impeller 24.

The reinforcing ring 41 has the base part 43, and an engaging part 44 continuous with the base part 43. Accordingly, when a tensile force acts on the impeller body 31 to the radial outer side due to the centrifugal force in a case where the impeller body 31 has rotated, the engaging part 44 is caught inside the impeller body 31, so that the centrifugal force that acts on the impeller body 31 can be firmly distributed to the reinforcing ring 41. Therefore, it is possible to further reduce the stress generated in the impeller body 31, and deformation of the impeller body 31 can be suppressed.

The reinforcing ring 41 is formed of a complex material including a thermosetting resin and reinforcing fibers. Since the coefficient of linear expansion of the complex material is small compared to metals, slackening of the reinforcing ring 41 with respect to the impeller body 31 due to thermal expansion does not easily occur. Therefore, a centrifugal force that acts on the impeller body 31 can be effectively distributed to the reinforcing ring 41, and it is possible to further reduce a stress generated in the impeller body 31.

In a case where the reinforcing ring 41 is formed of metallic materials, the rigidity of reinforcing ring 41 itself becomes high. For this reason, deformation does not easily occur when a centrifugal force has acted, and slackening of the reinforcing ring 41 with respect to the impeller body 31 does not easily occur. Therefore, a centrifugal force that acts on the impeller body 31 can be effectively distributed to the reinforcing ring 41, and a stress generated in the impeller body 31 can be reduced.

Figure 3:
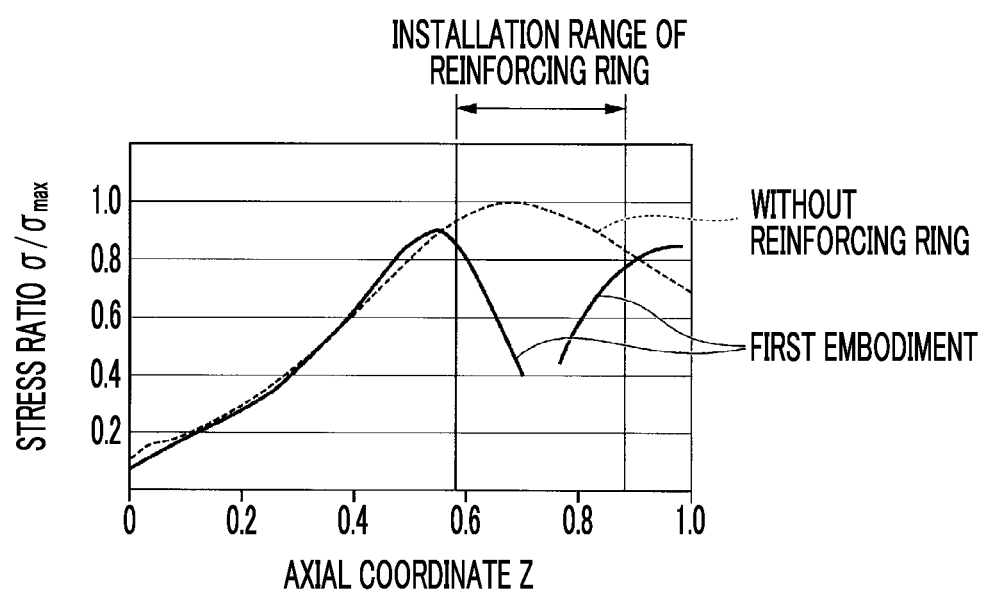
FIG. 3 is a graph of analysis results illustrating effects of a reinforcing ring in the impeller of the turbocharger of the first embodiment of the invention, a horizontal axis represents coordinates in a direction of an axis, and a vertical axis represents ratios obtained by dividing stresses generated in an impeller body by a maximum stress in a case where no reinforcing ring is provided. Additionally, a dashed line represents cases where no reinforcing ring is provided, and a solid line represents the impeller of the first embodiment.

Here, analysis results obtained by plotting the ratios $\rho/\rho max$ of stresses caused on the impeller body 31 in a case where the reinforcing ring 41 formed of aluminum is provided at a position of 0.4 times the diameter dimension of the impeller body 31 for each position coordinate of the impeller body 31 in the direction of the axis O are illustrated in FIG. 3. In this analysis, as a position coordinate in the direction of the axis O, an end part position on the other side of the axis O that becomes a side into which the air AR flows is set as 0, and an end part position on one side of the axis O that becomes a side from which the air AR flows is set as 1.0. Additionally, as analysis conditions, the thickness dimension of the reinforcing ring 41 in the direction of the axis O is 0.3 times the length of the impeller body 31 in the direction of the axis O and the width dimension of the reinforcing ring 41 in the radial direction is 0.05 times the outside dimension of the impeller body 31.

According to the analysis results of FIG. 3, since the reinforcing ring 41 is provided such that an outer peripheral end thereof is located at the position of 0.4 times the dimension of the impeller body 31 in the radial direction, it can be confirmed that a stress can be markedly reduced at a position where a position coordinate in the direction of the axis O becomes larger than about 0.6 and smaller than 0.8 times the length of the impeller body 31 in the direction of the axis O compared to a case (dashed line) where the reinforcing ring 41 is not provided.

On the other hand, in a case where the reinforcing ring 41 is not provided, stresses become gradually large as position coordinates become large, and a maximum value is represented at a position of about 0.7 times the length of the impeller body 31 in the direction of the axis O. That is, by providing the reinforcing ring 41, it can be confirmed that a maximum value of a stress generated in the impeller body 31 can be suppressed to be low.

Second Embodiment

Figure 4:
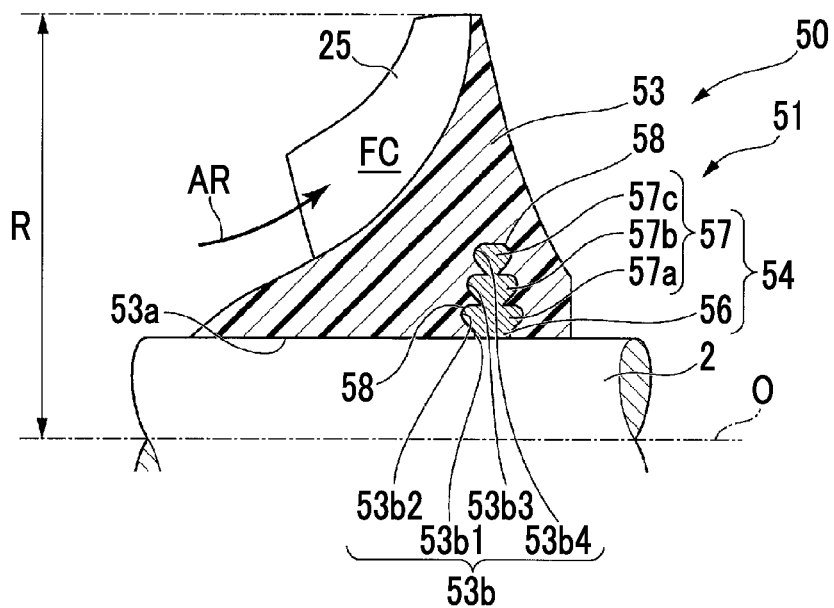
FIG. 4 is a longitudinal sectional view illustrating an impeller of a turbocharger related to a second embodiment of the invention.

Next, a second embodiment of the invention will be described with reference to FIG. 4.

The same constituent elements as those of the first embodiment will be designated by the same reference signs, and the detailed description thereof will be omitted.

The turbocharger 50 of the present embodiment is different from the first embodiment in a compressor impeller 51.

The compressor impeller 51 includes a plurality of the compressor blades 25, the impeller body 53 that supports the compressor blades 25 on the front surface side, and a reinforcing ring 54 disposed inside the impeller body 53.

A boss hole section 53a having the rotating shaft 2 inserted therethrough and fitted thereinto is formed in the impeller body 53. An annular groove part 53b of the rotating shaft 2 that is recessed to the radial outer side and runs in the circumferential direction is formed in an inner peripheral surface of the boss hole section 53a.

As the annular groove part 53b, a first-stage groove part 53b1 that opens to the inner peripheral surface of the boss hole section 53a, extends to the radial outer side, and forms a rectangular shape as the shape of a cross-section including the axis O, and a second-stage groove part 53b2, a third-stage groove part 53b3, and a fourth-stage groove part 53b4 that communicate with the first-stage groove part 53b1 on the radial outer side and communicate with each other in the radial direction are formed.

The second-stage groove part 53b2 extends from the first-stage groove part 53b1 to the radial outer side and both sides in the direction of the axis O. In the second-stage groove part 53b2, the shape of a cross-section including the axis O forms a substantially elliptical shape.

The third-stage groove part 53b3 extends from the second-stage groove part 53b2 to the radial outer side. In the third-stage groove part 53b3, the shape of a cross-section including the axis O forms a substantially elliptical shape that is smaller than the second-stage groove part 53b2.

The fourth-stage groove part 53b4 extends from the third-stage groove part 53b3 to the radial outer side. In the fourth-stage groove part 53b4, the shape of a cross-section including the axis O forms a substantially elliptical shape that is smaller than the second-stage groove part 53b2.

In this way, the annular groove part 53b has a christmas tree-shaped cross-section.

The reinforcing ring 54 is disposed inside the annular groove part 53b of the impeller body 53. Namely, the reinforcing ring 54 has a base part 56 that has a rectangular cross-section corresponding to the first-stage groove part 53b1 and forms an annular shape in the circumferential direction of the impeller body 31, and an engaging part 57 that extends to both sides in the direction of the axis O from the base part 56, on the radial outer side closer to the inside of the impeller body 31 than the base part 56 continuously with the base part 56.

The reinforcing ring 54 is disposed without a gap inside the annular groove part 53b. The base part 56 is exposed to the inner peripheral surface of the boss hole section 53a and is flush with the inner peripheral surface. In this way, the reinforcing ring 54 forms an annular shape about the axis O and has a christmas tree-shaped cross-section, in a state where the reinforcing ring is disposed inside the impeller body 53.

In more detail, as the engaging part 57 of the reinforcing ring 54, a first engaging part 57a that has an elliptical cross-section, a second engaging part 57b that has an elliptical cross-section smaller than the first engaging part 57a, and a third engaging part 57c that has an elliptical cross-section smaller than the second engaging part 57b are formed. The first engaging part 57a, the second engaging part 57b, and the third engaging part 57c each have the elliptical cross-section, and thereby, have a curved engaging surface 58 that is an outer surface curved so as to protrude toward the impeller body 53.

According to the turbocharger 50 of the present embodiment described above, a centrifugal force that acts on the impeller body 53 can be distributed to the reinforcing ring 54 similar to the first embodiment by disposing the reinforcing ring 54 inside the impeller body made of the resin in the compressor impeller 51. Accordingly, a stress generated in the impeller body 53 by a centrifugal force can be reduced.

Figure 5:
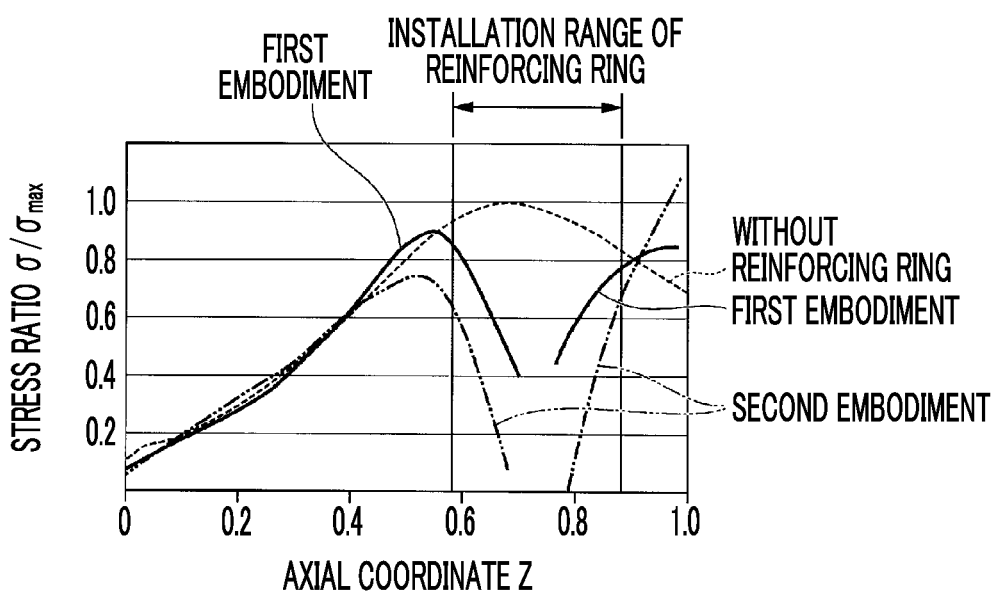
FIG. 5 is a graph of analysis results illustrating effects of a reinforcing ring in the impeller of the turbocharger of the second embodiment of the invention, a horizontal axis represents coordinates in a direction of an axis, and a vertical axis represents ratios obtained by dividing stresses generated in an impeller body by a maximum stress in a case where no reinforcing ring is provided. Additionally, a dashed line represents cases where no reinforcing ring is provided, a solid line represents the impeller of the first embodiment, and a two-dot chain line represents the impeller of the second embodiment.

Here, analysis results obtained by plotting the ratios ρ/ρmax of stresses caused on the impeller body 53 in a case where an outer peripheral end (an end part on the radial outer side) of the reinforcing ring 54 formed of aluminum is provided at a position of 0.4 times the diameter dimension R of the impeller body 53 for each position coordinate of the impeller body 53 in the direction of the axis O are illustrated in FIG. 5. As analysis conditions, the thickness dimension of the reinforcing ring 54 in the direction of the axis O is 0.3 times the length of the impeller body 31 in the direction of the axis O and the width dimension of the reinforcing ring 54 in the radial direction is 0.05 times the outside dimension of the impeller body 31. The other analysis conditions are the same as those illustrated in FIG. 3 in the first embodiment.

According to the analysis results of FIG. 5, since the reinforcing ring 54 is provided such that an outer peripheral end thereof is located at the position of 0.4 times the dimension of the impeller body 53 in the radial direction, it can be confirmed that a stress can be markedly reduced at a position where a position coordinate in the direction of the axis O becomes larger than about 0.6 and smaller than 0.8 times the length of the impeller body 31 in the direction of the axis O compared to a case (dashed line) where the reinforcing ring 54 is not provided.

On the other hand, in a case where the reinforcing ring 54 is not provided, stresses become gradually large as position coordinates become large, and a maximum value is represented at a position of about 0.7 times the length of the impeller body 31 in the direction of the axis O. That is, by providing the reinforcing ring 54, it can be confirmed that a maximum value of a stress generated in the impeller body 53 can be suppressed to be low. Additionally, compared to the reinforcing ring 41 of the first embodiment, it can be confirmed that a stress can be suppressed to be markedly low at the position where a position coordinate is larger than 0.6 times and smaller than 0.8 times the length of the impeller body 31 in the direction of the axis O.

This is because the engaging part 57 of the reinforcing ring 54 of the present embodiment has the curved engaging surface 58. That is, by providing the curved engaging surface 58, when a tensile force to the radial outer side caused by a centrifugal force has acted on the impeller body 53, the concentration of a stress generated in the impeller body 53 can be suppressed at a position where the engaging part 57 contacts an inner surface of the annular groove part 53b of the impeller body 53. For this reason, further suppression of deformation or damage of the impeller body 53 is possible by the curved engaging surface 58.

In addition, in the present embodiment, the engaging part 57 of the reinforcing ring 54 is configured to have a site having the three sectional elliptical cross-section of the first engaging part 57a, the second engaging part 57b, and the third engaging part 57c. However, the engaging part is not limited to such a case. That is, the engaging part may be formed by a site having elliptical cross-sections that are more than three or less than three. Additionally, the engaging part is not limited to the case having the site of such elliptical cross-sections, and may have simply a site of a true circular cross-section.

Third Embodiment

Figure 6:
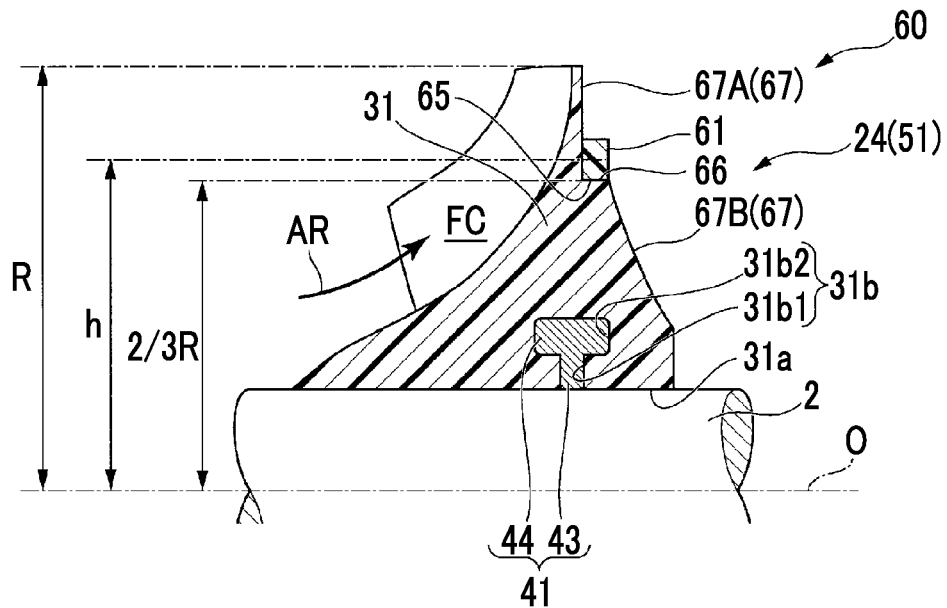
FIG. 6 is a longitudinal sectional view illustrating an impeller of a turbocharger related to a third embodiment of the invention.

Next, a third embodiment of the invention will be described with reference to FIG. 6.

The same constituent elements as those of the first and second embodiments will be designated by the same reference signs, and the detailed description thereof will be omitted.

In a turbocharger 60 of the present embodiment, the compressor impeller 24 (or the compressor impeller 51 of the second embodiment) of the first embodiment further includes a second reinforcing ring 61.

The second reinforcing ring 61 is fitted to a step section 65, which is formed in a back surface of the impeller body 31 and has a fitting surface 66 as a surface that faces the outer peripheral side, from the outer peripheral side, is formed of the above resin and reinforcing fibers, and forms an annular shape.

Here, the step section 65 is formed so as to be recessed in an annular shape about the axis O from a back surface 67 of the impeller body 31 toward the other side in the direction of the axis O. The step section 65 splits the back surface 67 into a first back surface 67A located on the radial outer side and a second back surface 67B located on the radial inner side.

The first back surface 67A and the second back surface 67B are formed in the radial direction. The fitting surface 66 is disposed between the first back surface 67A and the second back surface 67B, and the step section 65 is formed on the back surface 67 by connecting the first back surface 67A and the second back surface 67B.

In addition, the second back surface 67B is inclined so as to face one side in the direction of the axis O while being curved in a concave shape to the other side in the direction of the axis O as it becomes closer to the radial inner side, and is continuous with the boss hole section 31a after being bent so as to run in the radial direction from a halfway position.

In the present embodiment, the fitting surface 66 in this step section 65 is formed at the position of ⅔ of the diameter dimension R between the axis O and the outer peripheral end (the end part on the outermost side in the radial direction) of the impeller body 31 from the axis O that becomes the rotation center axis of the impeller body 31.

In addition, the formation position of the fitting surface 66 is not limited to the above case. For example, the step section 65 may be formed so as to be larger than 0.1 times the diameter dimension R between the rotation center axis of the impeller body 31 and the outer peripheral end of the impeller body 31 from the rotation center axis (axis O) of the impeller body 31 and such that the center of the second reinforcing ring 61 in the radial direction is located at a position smaller than the diameter dimension R.

That is, in a case where a distance between the center of the second reinforcing ring 61 in the radial direction and the axis O is defined as h, the second reinforcing ring 61 may be provided so as to satisfy 0.1R<h<1.0R.

The second reinforcing ring 61 forms an annular shape, and is fitted to the step section 65 of the impeller body 31 from the outer peripheral side. That is, when an inner peripheral surface of the second reinforcing ring contacts the fitting surface 66 in the step section 65, the second reinforcing ring is fitted to the step section 65. Additionally, in a state where the second reinforcing ring 61 is fitted, the second reinforcing ring 61 is formed in a shape and a size such that the center of the second reinforcing ring 61 coincides with the axis O, and the second reinforcing ring 61 is smoothly continuous with the second back surface 67B of the impeller body 31.

In the present embodiment, the shape of a cross-section including the axis O forms a rectangular shape, the thickness dimension in the direction of the axis O of coincides with the length dimension of the fitting surface 66, and the width dimension in the radial direction is larger than the thickness dimension in the direction of the axis O.

The second reinforcing ring 61 is formed of the same resin as that of the compressor blades 25 and the impeller body 31 and further the above reinforcing fibers. That is, the second reinforcing ring 61 is formed of a complex material (carbon fiber reinforced plastic) consisting of resin and carbon fibers, in the present embodiment. Here, the second reinforcing fibers in the second reinforcing ring 61 are not limited to the carbon fibers, and may be glass fibers, Whisker, and the like.

The second reinforcing ring 61 may be provided so as to be fitted into the impeller body 31 by insert molding, or may be provided by recoating the fitting surface 66 in the step section 65 with a fiber reinforcing resin.

According to the turbocharger 60 of the present embodiment described above, the second reinforcing ring 61 is further provided. Here, since the second reinforcing ring 61 is formed of a complex material including a resin, the material of the second reinforcing ring 61 and the material of the impeller body 31 become substantially the same. For this reason, a difference between the coefficients of linear expansion of the impeller body 31 and the second reinforcing ring 61 becomes small. As a result, there is no influence caused by thermal expansion, and the impeller body 31 can be constrained by the second reinforcing ring 61.

Moreover, since the density of the resin is low compared to the metal or the like, an increase in the diameter of the second reinforcing ring 61 caused by a centrifugal force can be suppressed, and the impeller body 31 can be suppressed by the second reinforcing ring 61.

Additionally, since the second reinforcing ring 61 includes the carbon fibers as the reinforcing resin, rigidity can be improved, an increased in diameter caused by the centrifugal force of the second reinforcing ring 61 itself can be suppressed, and the impeller body 31 can be constrained by the second reinforcing ring 61.

As a result, a centrifugal force that acts on the impeller body 31 can also be distributed to the second reinforcing ring 61, and a stress generated in the impeller body 31 due to the centrifugal force can be further reduced.

In addition, in the present embodiment, the second reinforcing ring 61 may be formed of only the reinforcing fibers.

Figure 7:
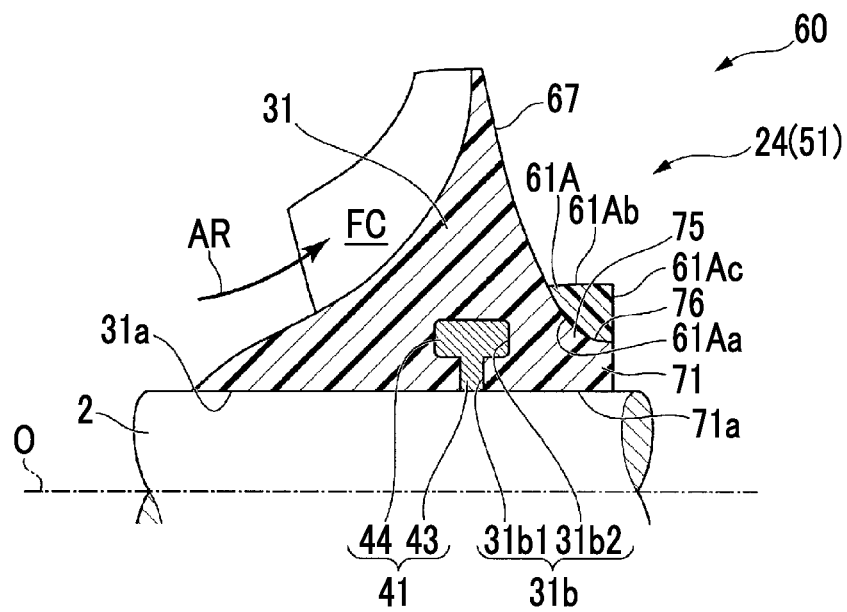
FIG. 7 is a longitudinal sectional view illustrating an impeller of a turbocharger related to a modification example of a third embodiment of the invention.

Additionally, as illustrated in FIG. 7, a second reinforcing ring 61A may be provided at a boss part 71 provided so as to protrude from the back surface 67 of the impeller body 31 to one side in the direction of the axis O.

That is, the boss part 71 is formed integrally with the impeller body 31 at a position on the radial inner side in the impeller body 31, and forms an annular shape about the axis O. A boss hole section 71a that is continuous with the boss hole section 31a is formed at the boss part 71. The rotating shaft 2 is fitted to the boss hole section 71a.

The boss part 71 has a fitting surface 76 that faces the radial outer side. The fitting surface 76 is smoothly continuous with the curved back surface 67 of the impeller body 31. Accordingly, the fitting surface 76 is formed in a rounded shape that is smoothly curved toward one side in the direction of the axis O so as to run in the direction of the axis O as it becomes closer to the radial inner side.

When an inner peripheral surface 61Aa of the second reinforcing ring 61A contacts the fitting surface 76 of the boss part 71, the second reinforcing ring 61A is fitted to the boss part 71. That is, in the present embodiment, a step section 75 having the fitting surface is formed at the boss part 71, and the second reinforcing ring 61A is fitted to the step section 75.

Here, in the second reinforcing ring 61A, the shape of a cross-section including the axis O does not form a rectangular shape, and the shape of this cross-section is such that the inner peripheral surface 61Aa that faces the radial inner side becomes a curved surface that forms a convex shape toward the axis O. The shape of this curved surface corresponds to the curved shape of the fitting surface 76.

Additionally, an outer peripheral surface 61Ab that extends substantially parallel to the axis O continuously with the inner peripheral surface 61Aa, which becomes the above curved surface, and faces the radial outer side, and an axial surface 61Ac that connects the inner peripheral surface 61Aa and the outer peripheral surface 61Ab together, is orthogonal to the axis O, and faces one side in the direction of the axis O are formed in the second reinforcing ring 61A.

Therefore, by providing the second reinforcing ring 61A at the boss part 71 of the impeller body 31, a stress caused by a centrifugal force in the boss part 71 can be reduced, and a stress generated in the impeller body 31 can be further reduced.

Although the embodiments of the invention have been described above in detail, some design changes can also be made without departing from the technical idea of the invention.

For example, the sectional shape of the reinforcing ring 41 (54) is not limited to the cases of the above-described embodiments. That is, the reinforcing ring 41 (54) may not have the base part 43 (56) and the engaging part 44 (57), and may consist only of the base part 43 (56).

Additionally, the reinforcing fibers of the reinforcing ring 41 (54) may be disposed so as to extend in the circumferential direction of the rotating shaft 2. In this case, if a centrifugal force acts on the impeller body 31 (53), a tensile force acts in the circumferential direction on the reinforcing ring 41 or 54 such that the diameter of the reinforcing ring increases. For this reason, since the reinforcing fibers extend in the circumferential direction that is a direction in which this tensile force acts, deformation of the reinforcing ring 41 (54) by such a tensile force itself can be suppressed.

Therefore, even if a centrifugal force acts, slackening of the reinforcing ring 41 (54) with respect to the impeller body 31 (53) does not easily occur, and deformation of the entire compressor impeller 24 (51) can be suppressed.

Moreover, the reinforcing ring 41 (54) is not exposed to the inner peripheral surface of the boss hole section 31a (53a), and may be completely embedded inside the impeller body 31.

Additionally, the outer peripheral end of the reinforcing ring 41 (54) may be formed at a position that is larger than 0.1 times the diameter dimension R between the axis O and the outer peripheral end of the impeller body 31 (53), from axis O of the impeller body 31 (53). That is, the reinforcing ring 41 (54) may be provided such that the diameter dimension R of the impeller body 31 (53) satisfies $0.1<R<1.0$.

Since the reinforcing ring 41 (54) is disposed at such a position, a centrifugal force that acts on the impeller body 31 (53) can be more effectively distributed to the reinforcing ring 41 (54), and a stress generated in the impeller body 31 (53) by the centrifugal force can be reduced.

Additionally, the reinforcing ring 41 (54) may be disposed at a position in the direction of the axis O where a stress generated in the impeller body 31 (53) reaches a maximum. Since the reinforcing ring 41 (54) is provided at such a position, a centrifugal force that acts on the impeller body 31 (53) can be more effectively distributed to the reinforcing ring 41 (54), and a stress generated in the impeller body 31 (53) due to the centrifugal force can be reduced.

Additionally, in the above-described case, the shape and radial installation position of the second reinforcing ring 61 or 61A are not limited to the above cases.

Additionally, in the above-described embodiments, as the rotary machine, the turbocharger has been described as an example. However, the invention may be used for other centrifugal compressors and the like.

INDUSTRIAL APPLICABILITY

According to the above-described impeller and rotary machine, the reinforcing ring is disposed inside the impeller body. Thus, even if resin materials are used, it is possible to guarantee reliability.

REFERENCE SIGNS LIST

1: TURBOCHARGER (ROTARY MACHINE)
2: ROTATING SHAFT
3: TURBINE
4: COMPRESSOR
5: HOUSING COUPLING PART
6: BEARING
11: TURBINE HOUSING
12: SCROLL PASSAGE
13: DISCHARGE PORT
14: TURBINE IMPELLER
15: TURBINE BLADE
21: COMPRESSOR HOUSING
22: COMPRESSOR PASSAGE
23: SUCTION PORT
24: COMPRESSOR IMPELLER
25: COMPRESSOR BLADE
31: IMPELLER BODY
31a: BOSS HOLE SECTION
31b: ANNULAR GROOVE PART
31b1: INSIDE GROOVE PART
31b2: OUTSIDE GROOVE PART
41: REINFORCING RING
43: BASE PART
44: ENGAGING PART
50: TURBOCHARGER (ROTARY MACHINE)
51: COMPRESSOR IMPELLER
53: IMPELLER BODY
53a: BOSS HOLE SECTION
53b: ANNULAR GROOVE PART
53b1: FIRST-STAGE GROOVE PART
53b2: SECOND-STAGE GROOVE PART
53b3: THIRD-STAGE GROOVE PART
53b4: FOURTH-STAGE GROOVE PART
54: REINFORCING RING
56: BASE PART
57: ENGAGING PART
57a: FIRST ENGAGING PART
57b: SECOND ENGAGING PART
57c: THIRD ENGAGING PART
58: CURVED ENGAGING SURFACE
60: TURBOCHARGER (ROTARY MACHINE)
61: SECOND REINFORCING RING
65: STEP SECTION
66: FITTING SURFACE
67: BACK SURFACE
67A: FIRST BACK SURFACE
67B: SECOND BACK SURFACE
61A A SECOND REINFORCING RING
61Aa: INNER PERIPHERAL SURFACE
61Ab: OUTER PERIPHERAL SURFACE
61Ac: AXIAL SURFACE
71: BOSS PART
71a: BOSS HOLE SECTION
75: STEP SECTION
76: FITTING SURFACE

77: BACK SURFACE
G: EXHAUST GAS
AR: AIR
O: AXIS
FC: FLOW PASSAGE

The invention claimed is:

1. An impeller comprising:
an impeller body that is formed of a resin, forms a disk-like shape about an axis, and has a boss hole section formed therein, a rotating shaft rotating about the axis being fitted to the boss hole section;
a plurality of blades provided on a front surface side of the impeller body; and
a reinforcing ring that is disposed in a circumferential direction of the impeller body inside the impeller body, and forms an annular shape,
wherein the reinforcing ring has
a base part that forms an annular shape in the circumferential direction of the rotating shaft, and
an engaging part that extends in a direction of the axis from the base part, on a side closer to the inside of the impeller body than the base part.

2. The impeller according to claim 1,
wherein the base part is exposed to an inner peripheral surface of the boss hole section in the impeller body.

3. The impeller according to claim 2,
wherein the engaging part in the reinforcing ring has a curved engaging surface that is curved so as to protrude toward the impeller body side.

4. The impeller according to claim 1,
wherein the reinforcing ring is disposed at a position in the direction of the axis where a stress generated in the impeller body reaches a maximum.

5. The impeller according to claim 1,
wherein an outer peripheral end of the reinforcing ring is disposed at a position that is spaced apart to be larger than 0.1 times a diameter dimension between the axis and the outer peripheral end of the impeller body, from the axis of the impeller body.

6. The impeller according to claim 1,
wherein the reinforcing ring is formed of a complex material including a thermosetting resin and reinforcing fibers.

7. The impeller according to claim 6,
wherein the reinforcing ring is disposed such that the reinforcing fibers extend in the circumferential direction of the impeller body.

8. The impeller according to claim 1,
wherein the reinforcing ring is formed of a metal material.

9. The impeller according to claim 1, further comprising:
a second reinforcing ring that is formed on a back surface of the impeller body, is fitted to a step section, having a surface facing an outer peripheral side, from the outer peripheral side, is formed of a resin and reinforcing fibers, and forms an annular shape.

10. A rotary machine comprising:
the impeller according to claim 1; and
a rotating shaft that is attached to the impeller and rotates together with the impeller.

11. The impeller according to claim 2,
wherein the reinforcing ring is disposed at a position in the direction of the axis where a stress generated in the impeller body reaches a maximum.

12. The impeller according to claim 3,
wherein the reinforcing ring is disposed at a position in the direction of the axis where a stress generated in the impeller body reaches a maximum.

13. The impeller according to claim 2,
wherein an outer peripheral end of the reinforcing ring is disposed at a position that is spaced apart to be larger than 0.1 times a diameter dimension between the axis and the outer peripheral end of the impeller body, from the axis of the impeller body.

14. The impeller according to claim 3,
wherein an outer peripheral end of the reinforcing ring is disposed at a position that is spaced apart to be larger than 0.1 times a diameter dimension between the axis and the outer peripheral end of the impeller body, from the axis of the impeller body.

15. The impeller according to claim 4,
wherein an outer peripheral end of the reinforcing ring is disposed at a position that is spaced apart to be larger than 0.1 times a diameter dimension between the axis and the outer peripheral end of the impeller body, from the axis of the impeller body.

16. The impeller according to claim 2,
wherein the reinforcing ring is formed of a complex material including a thermosetting resin and reinforcing fibers.

17. The impeller according to claim 3,
wherein the reinforcing ring is formed of a complex material including a thermosetting resin and reinforcing fibers.

18. The impeller according to claim 4,
wherein the reinforcing ring is formed of a complex material including a thermosetting resin and reinforcing fibers.

19. The impeller according to claim 5,
wherein the reinforcing ring is formed of a complex material including a thermosetting resin and reinforcing fibers.

20. The impeller according to claim 2,
wherein the reinforcing ring is formed of a metal material.

* * * * *